(12) United States Patent
Klumpner et al.

(10) Patent No.: US 10,436,263 B2
(45) Date of Patent: Oct. 8, 2019

(54) INTERNAL EXPANDING SHOE BRAKE, IN PARTICULAR WEDGE-ACTUATED SIMPLEX BRAKE, WITH AN ACTUATOR FOR EXPANDING BRAKE SHOES

(71) Applicant: Knott GmbH, Eggstätt (DE)

(72) Inventors: Andreas Klumpner, St. Georgen (DE); Wolfgang Buchauer, Aschau im Chiemgau (DE)

(73) Assignee: KNOTT GMBH, Eggstätt (DE)

( * ) Notice: Subject to any disclaimer, the term of this patent is extended or adjusted under 35 U.S.C. 154(b) by 0 days.

(21) Appl. No.: 15/508,702

(22) PCT Filed: Aug. 18, 2015

(86) PCT No.: PCT/EP2015/001702
§ 371 (c)(1),
(2) Date: Apr. 3, 2017

(87) PCT Pub. No.: WO2016/034268
PCT Pub. Date: Mar. 10, 2016

(65) Prior Publication Data
US 2017/0276196 A1    Sep. 28, 2017

(30) Foreign Application Priority Data
Sep. 4, 2014    (DE) .................. 10 2014 013 146

(51) Int. Cl.
*F16D 65/22*    (2006.01)
*F16D 51/24*    (2006.01)
(Continued)

(52) U.S. Cl.
CPC .............. *F16D 51/24* (2013.01); *F16D 51/18* (2013.01); *F16D 65/562* (2013.01); *F16D 65/22* (2013.01); *F16D 2125/66* (2013.01)

(58) Field of Classification Search
CPC .......... F16D 2125/66; F16D 2125/587; F16D 65/22; F16D 65/562; F16D 51/50; F16D 51/28
(Continued)

(56) References Cited

U.S. PATENT DOCUMENTS

| 3,227,247 A | 1/1966 | Sherretts et al. |
| 3,261,434 A * | 7/1966 | Brucker ................ F16D 65/562 188/196 BA |

(Continued)

FOREIGN PATENT DOCUMENTS

| DE | 1 755 029 | 10/1957 |
| DE | 200 130 | 3/1983 |

(Continued)

OTHER PUBLICATIONS

International Preliminary Report on Patentability from PCT/EP2015/001702 dated Mar. 7, 2017.
(Continued)

*Primary Examiner* — Bradley T King
*Assistant Examiner* — Stephen M Bowes
(74) *Attorney, Agent, or Firm* — Nixon & Vanderhye P.C.

(57) ABSTRACT

An internal expanding shoe brake comprises expansion pistons (17) for forcing opposing brake shoes (2) apart. In each expansion piston (17) one adjusting pin (30) is axially movably arranged and presses against a brake shoe web (4) by means of a pressure piece (34). Said pressure piece (34) is supported on the adjusting pin by means of a ball joint so as to pivot in any direction. In order to prevent the adjusting pin (30) from being twisted inside the expansion piston (17), an anti-rotation element is provided and comprises a pressure piece projection (39) which projects over the ball joint surface (36) of the pressure piece (34), said projection interlockingly engaging in a receiving opening (40) of the
(Continued)

adjusting pin (30) with lateral play and forming a rotational coupling connection.

12 Claims, 3 Drawing Sheets

(51) Int. Cl.
*F16D 65/56* (2006.01)
*F16D 51/18* (2006.01)
*F16D 125/66* (2012.01)

(58) Field of Classification Search
USPC .................................................. 188/343, 364
See application file for complete search history.

(56) References Cited

U.S. PATENT DOCUMENTS

| | | | | |
|---|---|---|---|---|
| 3,295,637 A * | 1/1967 | Wells | ...................... | F16D 65/22 188/152 |
| 3,322,241 A * | 5/1967 | Cox | ........................ | F16D 65/22 188/152 |
| 3,570,632 A * | 3/1971 | Williams | ................ | F16D 65/22 188/196 M |
| 3,592,303 A * | 7/1971 | Tincher | ................... | F16D 51/14 188/264 G |
| 3,647,034 A * | 3/1972 | Wieger | ................... | F16D 65/22 188/343 |
| 4,603,762 A * | 8/1986 | Kajihara | ............... | F16D 65/561 188/196 BA |
| 4,637,499 A | 1/1987 | Rupprecht | | |

FOREIGN PATENT DOCUMENTS

| | | |
|---|---|---|
| DE | 34 34 736 | 4/1986 |
| EP | 0 410 598 | 1/1991 |

OTHER PUBLICATIONS

International Search Report issued in PCT/EP2015/001702, dated Feb. 9, 2016, 7 pages.

* cited by examiner

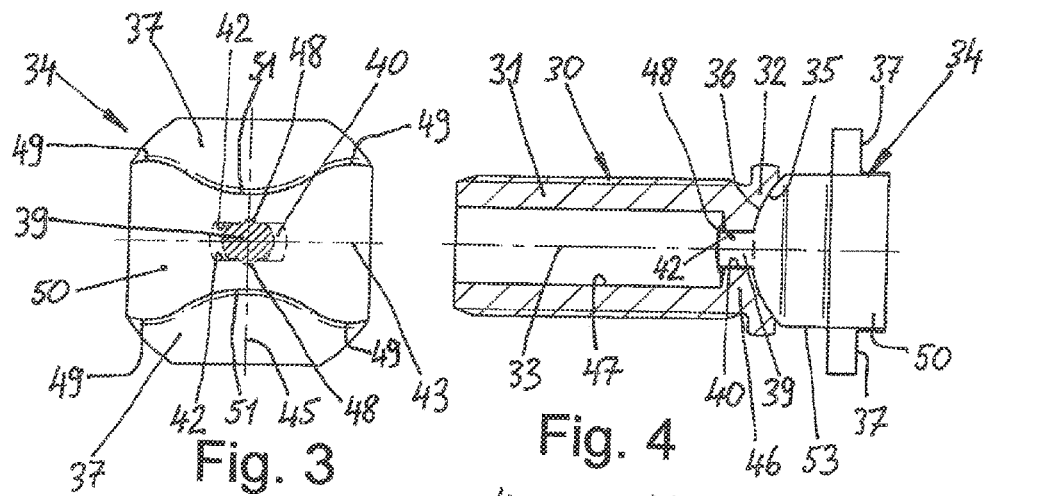
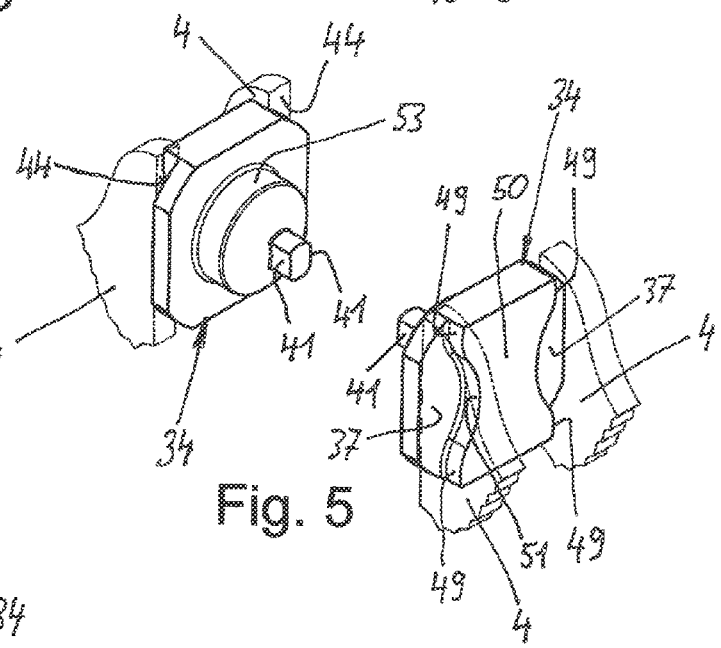
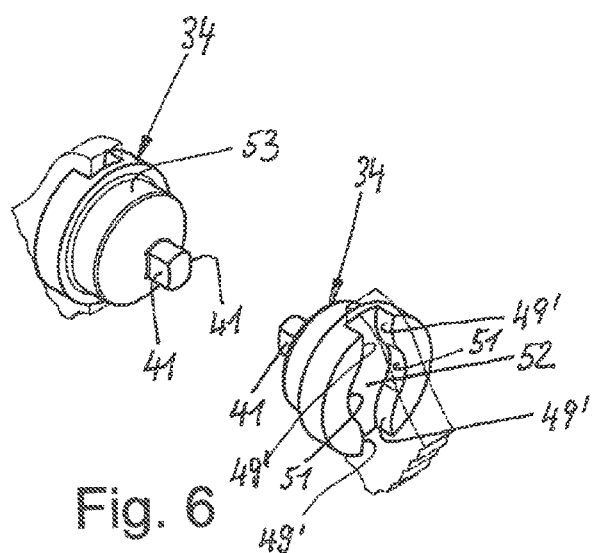

INTERNAL EXPANDING SHOE BRAKE, IN PARTICULAR WEDGE-ACTUATED SIMPLEX BRAKE, WITH AN ACTUATOR FOR EXPANDING BRAKE SHOES

This application is the U.S. national phase of International Application No. PCT/EP2015/001702 filed 18 Aug. 2015, which designated the U.S. and claims priority to DE Patent Application No. 10 2014 013 146.7 filed 4 Sep. 2014, the entire contents of each of which are hereby incorporated by reference.

The invention relates to an internal expanding shoe brake, in particular a wedge-actuated simplex brake, comprising an actuating device for expanding brake shoes according to the preamble of claim 1.

DD 200 130 B1 discloses an actuating device for an internal expanding shoe brake in which the end face of an expansion piston facing the brake shoe comprises a channel-shaped recess having an arcuate cross section. An additional thrust member having a partially cylindrical bearing surface is provided between the end face of the expansion piston and the brake shoe web and is pivotally mounted in the channel-shaped recess such that a pivot bearing is formed that operates in one plane. The opposite, square end of the thrust member can be slid in a groove formed by a pressure plate arranged on the brake shoe web. Since a torque can be transmitted by the partially cylindrical pivot bearing, the thrust member can be twisted in order to potentially reset an adjusting device once a shoe return spring has been removed and the brake shoe has been pivoted outwards. Furthermore, a cap that is standard in brake cylinders and has two circumferential, radial beads is used.

This is disadvantageous in that a separate component in the form of a pressure plate is required in addition to the thrust member, and this increases the number of parts required. Furthermore, a pivoting movement of the thrust member is only made possible about the longitudinal axis of the brake, and not the vertical axis thereof. If the friction linings are worn obliquely, which may occur depending on the manufacturing tolerances or heat-related deformation of the brake drum, the thrust member cannot compensate for this movement and the pivot bearing is warped, leading to an increase in hysteresis. In addition, the joint formed by the expansion piston and the thrust member does not remain in position without external force. Neither the partially cylindrical bearing surfaces nor the stiffness of the cap are sufficient for secure retention. The desired orientation of the components relative to one another cannot be ensured before the shoe return spring is mounted.

DE 34 34 736 A1 discloses an actuating unit of an internal expanding shoe brake according to the preamble of claim 1, in which an adjusting bolt is used which has a domed depression on its end face facing the brake shoe. An additional thrust member is inserted between the adjusting bolt and the brake shoe web, which member is mounted so as to pivot in the depression in the adjusting bolt in all directions by means of a spherical end portion and also is in engagement with the end of the brake shoe web by means of a planar end face and two lateral guide surfaces. Therefore, a polydirectional pivot bearing in the form of a ball joint is produced. So that the adjusting bolt cannot be unintentionally turned by an adjusting device, the thrust member is surrounded by a spring clip. This spring clip engages around the brake shoe web from both sides and prevents any turning in cooperation with a toothed ring of the adjusting bolt. Once a certain level of force is overcome, it is possible to manually reset the adjusting bolt.

This known solution has the drawback that there is an additional spring clip that functions between the brake shoe web and the adjusting bolt. Owing to its friction, the spring clip has an undesired effect on the movements of the thrust member relative to the adjusting bolt and the brake shoe web. An additional crown gear is required on the adjusting bolt, with which gear the spring clip can come into engagement. In addition, in this known actuating device the pivot bearing is not sealed by a seal between the thrust member and the adjusting bolt, and therefore there is a high risk of soiling and of the operation of the pivot bearing being impaired.

The problem addressed by the invention is therefore to provide an internal expanding shoe brake of the type mentioned at the outset that comprises an actuating device by means of which the adjusting bolt can be prevented from turning in an undesired manner relative to the brake shoe web as simply and as cost-effectively as possible and by using as few parts as possible, and which allows the adjusting bolt and the brake shoe to be operatively connected with little stress.

This problem is solved according to the invention by an internal expanding shoe brake having the features of claim 1. Advantageous embodiments of the invention are described in the rest of the claims.

In the internal expanding shoe brake according to the invention, an anti-twist protection device is provided for preventing rotational movement of the adjusting bolt, which device comprises a thrust member extension that protrudes over the ball joint surface of the thrust member and engages in a form-fitting manner in a receiving opening in the adjusting bolt with lateral play under formation of a rotary coupling connection.

The anti-twist protection device according to the invention means that the number of required components is reduced. Additional pressure plates on the brake shoe webs and spring clips and toothed rings on the adjusting bolt are not required. The anti-twist protection between the thrust member and the adjusting bolt can be moved into the region of the longitudinal axis of the adjusting bolt, while at the same time a polydirectional pivot bearing in the form of a ball joint can be produced. Because the anti-twist protection is arranged centrally, the friction effect thereof is reduced. In addition, pivot bearings and anti-twist protection can be easily arranged within a seal in this way such that they are optimally sealed from the external surroundings. Since a seal of this type seals the thrust member and the housing from the surroundings, expensive corrosion protection is only required for these two components. All the other components are in the protected internal region. The anti-twist protection according to the invention allows the actuating device to have a longer service life and can be simply and cost-effectively produced and installed.

Advantageously, the ball joint surface of the thrust member is designed as a joint head, while the ball joint surface of the adjusting bolt is designed as a ball socket. However, it is also conceivable for the ball joint surfaces to be the other way around, i.e. to provide a joint head on the adjusting bolt while the thrust member is provided with the ball socket.

Advantageously, the thrust member extension is arranged centrally on the thrust member and the receiving opening in the adjusting bolt is designed as a central axial opening. This results in a particularly simple, compact and symmetrical arrangement.

Advantageously, the lateral play of the thrust member extension within the receiving opening in the main plane of the backing plate is greater than in a transverse plane that is perpendicular to the main plane. As a result, it can be ensured that the thrust member can provide the required pivoting movement when expanding and resetting the brake shoes in the main plane of the backing plate and thus in the main plane of the associated brake shoe web, while the play between the thrust member and the adjusting bolt in the rotational direction can also be kept low enough that the rotational play of the adjusting bolt is negligible. At the same time, however, the play needs to be great enough to allow a pivoting movement of the thrust member in all directions and to prevent the adjusting bolt from warping laterally.

Advantageously, the thrust member extension comprises a rear-engagement element for axially securing the thrust member to the adjusting bolt. This rear-engagement element can in particular consist of a moulded portion on the free end of the thrust member extension, which portion engages behind a diametric shoulder of the receiving opening. In this case, the moulded portion may for example be formed by the free end region of the thrust member extension being subsequently plastically deformed once the thrust member extension has been inserted into the receiving opening. This means that the thrust member is secured against being unintentionally loosened or lost without adding additional components. The position of the thrust member on the adjusting bolt is maintained even if the shoe return springs are not installed.

As an alternative, it is however also entirely possible to design the rear-engagement element as an additional component that is fastened into the receiving opening on the free end of the thrust member extension after said thrust member extension is inserted.

A very simple and cost-effective embodiment of the anti-twist protection of the adjusting bolt is produced if the rotary coupling connection between the thrust member and the adjusting bolt is formed by means of parallel flats, which are provided on the thrust member extension and on the wall defining the receiving opening in the adjusting bolt. It is sufficient for two parallel flats to be provided on the thrust member extension and on the wall of the receiving opening, respectively. A different design and number of flats is also entirely possible, however. For example, the thrust member extension may be cubic. Furthermore, the thrust member extension may also have cross-sectional shapes other than a rectangle or a square that allow a rotary coupling connection provided with a certain amount of play between the thrust member and the adjusting bolt.

Advantageously, the thrust member comprises lateral guide surfaces for laterally guiding the thrust member on the brake shoe web on the side opposite the thrust member extension. These lateral guide surfaces may in particular be formed by the side walls of a guide groove located in the main plane of the brake shoe web if the thrust member interacts with a single brake shoe web, or alternatively may be formed by the side walls of a guide web if the thrust member engages between two brake shoe webs of a brake shoe.

Advantageously, the side walls comprise centrally setback depressions to produce clearance between the brake shoe web(s) and the side walls. As a result, the side walls of the guide groove or the guide web only contact the side walls of the associated brake shoe web in their two end regions. As a result, precisely defined, relatively short guide surfaces are produced which are relatively dirt-resistant.

Advantageously, a sealing contact surface adjoins the ball joint surface of the thrust member and, when viewed in the axial direction of the expansion piston, overlaps with or is directly axially adjacent to, but is radially within, a sealing contact surface of the housing. Arranging the sealing surfaces on the thrust member in the direct proximity of the ball joint surfaces makes it possible to provide an optimally protected pivot bearing of which the pivoting forces are not greatly influenced by the seal at the same time, and vice versa.

Advantageously, the ball joint surfaces are sealed from the outside by means of a bellows, which is at least substantially in a plane perpendicular to the central longitudinal axis of the expansion piston and comprises both an axial sealing surface for primary axial sealing and a radial sealing surface adjacent thereto for secondary radial sealing. Owing to the primary axial and secondary radial sealing, redundancy is provided at each sealing point, meaning that the parts arranged within the housing are sealed from the outside particularly effectively and reliably. In particular, the bellows can be reinforced by means of insert rings such that, once pressed on or in, requirements placed on a fordable actuating unit (that is liquid-tight to a limited extent) are met. Furthermore, by being fixed to the bellows, the lateral guide surfaces provided on the thrust member are oriented relative to the housing such that, when the brake shoe is mounted, the brake shoe web(s) can be pivoted in without colliding with the thrust member, and this provides significant advantages in serial assembly. Furthermore, the seal can be designed and arranged in a simple manner such that it is largely protected against the heat radiation from the friction surfaces between the brake linings and the brake drum.

The invention is explained in greater detail by way of example in the following on the basis of the drawings, in which:

FIG. 3 is a view of the end face of a thrust member of the actuating device, showing the receiving opening in the adjusting bolt;

FIG. 4 is a longitudinal section through the adjusting bolt and the thrust member from FIG. 3;

FIG. 5 is a three-dimensional view of thrust members according to FIG. 3 which are used in brake shoes comprising two brake shoe webs; and FIG. 6 is a three-dimensional view of thrust members which are used in brake shoes comprising one brake shoe web.

FIG. 1 shows essential parts of an internal expanding shoe brake 1 in the form of a wedge-actuated simplex brake; however, the invention is not limited to wedge-actuated simplex brakes of this type, but may also include other types of internal expanding shoe brakes, for example duplex brakes or power-assisted brakes.

Figure 1:
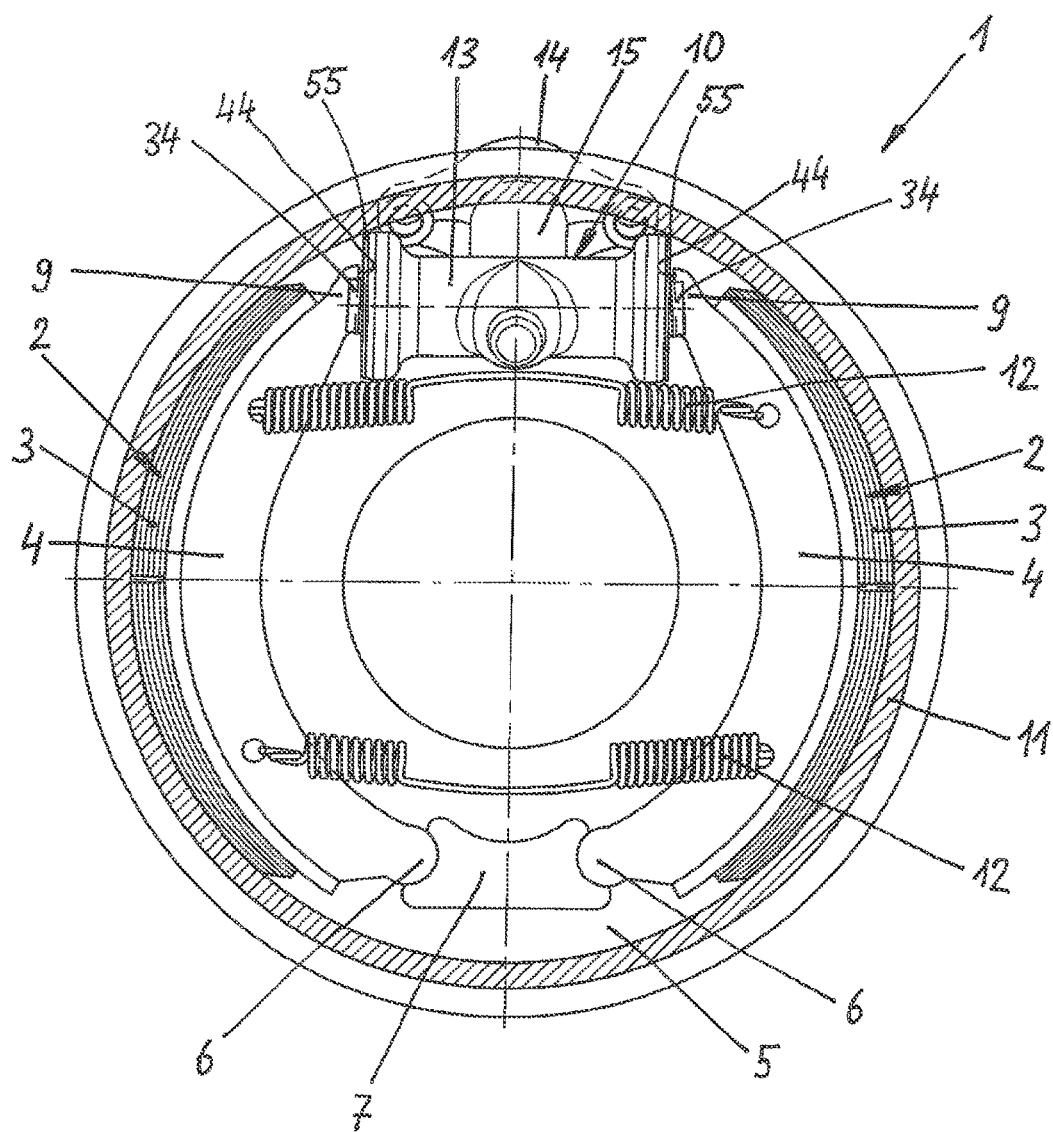
FIG. 1 is a side view of an internal expanding shoe brake comprising an actuating device, in which individual parts have been shown in a simplified manner or omitted for the sake of clarity.

Two brake shoes 2 of the internal expanding shoe brake 1 each comprise, in a conventional manner, a friction lining 3 and one or two brake shoe webs 4. The lower ends 6 of the brake shoe webs 4 are pivotally supported on a support bearing 7 that is fastened to a backing plate 5. By contrast, the upper ends 9 of the brake shoe webs 4 are supported on an actuating device 10, which is designed as a wedge-actuated device in the embodiment shown, and said ends can be pushed outwards by said wedge-actuated device in order to press the friction linings 3 against the circumferential wall of a brake drum 11 and carry out a braking process thereby. In order to retract the brake shoes 2 into their non-braking starting position, two shoe return springs 12 are provided which are hooked onto the opposing brake shoe webs 4 and pull the brake shoes 2 together.

The actuating device 10 comprises a housing 13 that is rigidly connected to the backing plate 5. The housing 13 comprises a T-shaped portion, which extends from the backing plate 5 into the space surrounded by the brake drum 11, and an outer flange portion 14, which is arranged on the opposite side of the backing plate 5 and is used to fasten a brake cylinder (not shown).

Figure 2:
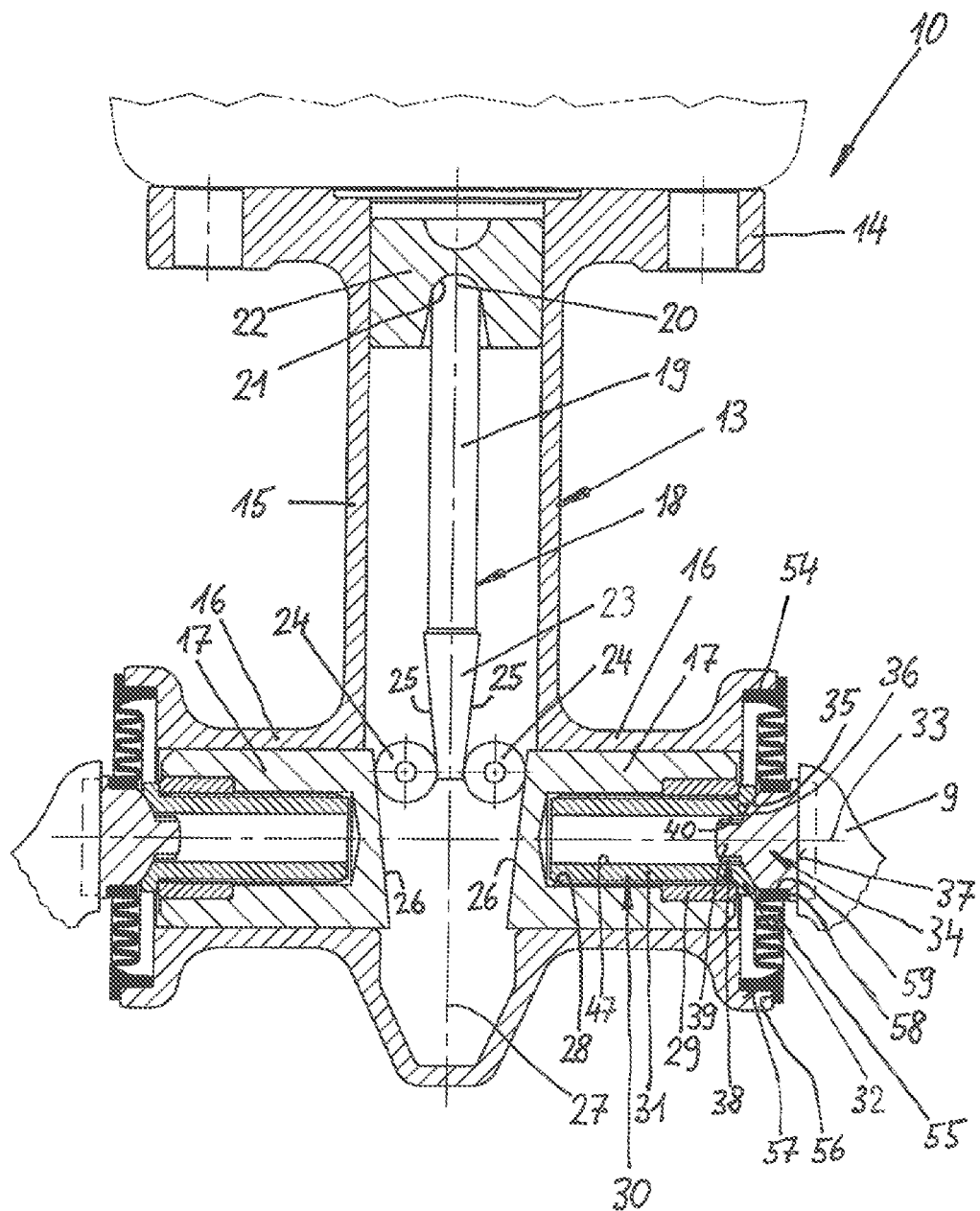
FIG. 2 is a section through the actuating device from FIG. 1.

As can be seen from FIG. 2, the housing 13 comprises a central, hollow cylindrical guide portion 15, to the outer end of which the flange portion 14 is connected, while two cylinder portions 16 extend laterally outwards in opposite directions and at right angles to the guide portion 15 from the opposite end of said housing located within the brake. One non-rotational expansion piston 17 is axially movably mounted within each of the cylinder portions 16.

The expansion piston 17 is moved by means of a pressure wedge 18, which can be moved longitudinally in the guide portion 13. The pressure wedge 18 comprises a shaft 19 having a hemispherical end 20, which is mounted in a concave depression 21 in a piston 22. The piston 22 is movably mounted within the guide portion 15 of the housing 13 and is moved by the brake cylinder (not shown).

The pressure wedge 18 comprises a wedge portion 23 on the opposite end. The wedge portion 23 engages between two rollers 24, which are positioned within the housing 13 by a cage (not shown) such that they can move between the two expansion pistons 17 in the movement direction of the pressure wedge 18.

The rollers 24 each rest on an oblique surface 25 of the wedge portion 23 as well as on an oblique surface 26 of the expansion pistons 17. Since the inclination of the oblique surfaces 25 corresponds to the inclination of the opposite oblique surfaces 26, the rollers 24 can roll between parallel oblique surfaces. If the pressure wedge 18 is pushed forwards, i.e. moved downwards in FIG. 2, the expansion pistons 17 are spread apart by the rollers 24, i.e. moved laterally outwards in opposite directions.

The housing 13 and the elements received therein are symmetrical to a central plane 27 of the actuating device 10. Therefore, in the following, the actuating device 10 is described solely on the basis of the half of the actuating device 10 shown in FIG. 2 that is arranged to the right of the central plane 27. The same applies to the left-hand half.

Each expansion piston 17 comprises an axial recess 28 or axial hole that is open towards its laterally outer end face. The axial recess 28 has a diametric step in the region remote from the oblique surface 26, in which step an adjusting nut 29 is rotatably mounted. The adjusting nut 29 is provided with a self-locking thread.

An adjusting bolt 30 is screwed into the adjusting nut 29 of each of the expansion pistons 17. For this purpose, the adjusting bolt 30 comprises a screw shank 31, which interacts with the internal thread of the adjusting nut 29 and extends into the axial recess 28, and an outer joint portion 32, which protrudes over the outer end face of the expansion piston 17. The adjusting bolt 30, adjusting nut 29, expansion piston 17 and brake cylinder portion 16 of the housing are arranged coaxially with one another and have the same central longitudinal axis 33.

The adjusting bolt 30 and adjusting nut 29 are part of an adjusting device which is not shown in greater detail in the following and by means of which the air gap between the brake shoes 2 and the braking surface of the brake drum 11 can be automatically adjusted if the thickness of the friction linings 3 decreases due to wear. For this purpose, the adjusting apparatus comprises additional actuating elements for rotating the adjusting nut 29, but these are not shown because they are not part of this claimed invention. The adjusting apparatus operates such that as the friction linings 3 become increasingly worn, the adjusting nut 29 is rotated by the actuating elements (not shown) such that the adjusting bolt 30 is unscrewed from the expansion piston 17 to such an extent that the wear to the brake linings is compensated and the air gap is kept at an optimum value.

A thrust member 34 is pivotally mounted on the outer joint portion 32 of each adjusting bolt 30 by means of a ball joint. For this purpose, the joint portion 32 comprises a concave ball joint surface 35 that forms a ball socket. The thrust member 34 comprises a convex ball joint surface 36 that is complementary thereto and forms a ball head. Owing to this ball joint, the thrust member 34 can be pivoted relative to the adjusting bolt 30 in all directions. In particular, the thrust member 34 can be pivoted in a plane that is parallel to the main plane of the backing plate 5 and is in particular vertical, and also in a plane that is at a right angle to this main plane and is in particular horizontal.

The end face 37 of the thrust member 34 opposite the ball joint rests in planar manner on a contact surface 44 on the upper end of the brake shoe web 4 and is held axially by the force of the shoe return springs 12 in a frictionally engaged manner so as to be in contact with the contact surface 44.

So that the adjusting bolts 30 can be moved in the axial direction by rotating the adjusting nuts 29, it is necessary for the two adjusting bolts 30 to be non-rotationally arranged between the associated ends 9 of the brake shoes 2. For this purpose, an anti-twist protection device is provided between the thrust member 34 and the adjusting bolt 30, and produces a rotary coupling connection between the thrust member 34 and the adjusting bolt 30 but also maintains all the degrees of freedom for the ball joint, which are required in order to pivot the thrust member 34 to such an extent that no warping occurs in the expansion piston 17.

For this purpose, the anti-twist protection device 38 comprises a thrust member extension 39 that protrudes axially over the ball joint surface 36 of the thrust member 34 and engages in a form-fitting manner, but with lateral play, in a receiving opening 40 in the adjusting bolt 30. As can be seen from FIG. 3 to 6, said thrust member extension 39 expediently extends so as to be aligned with the central longitudinal axis of the thrust member 34 and thus extends centrally from the ball joint surface 36, over this surface, towards the central plane 27 of the housing 13. In the embodiments shown in FIG. 3 to 6, the thrust member extension 39 consists of a cylinder member that has two parallel, planar flats 41. As an alternative, the thrust member extension 39 may also have flats that are shaped and arranged in other manners, and may for example be cubic. The receiving opening 40 that interacts with the thrust member extension 39 is designed as an axial opening that is coaxial with the central longitudinal axis 33 and has side walls that comprise flats 42 which are complementary to the flats 41 of the thrust member extension 39 and are mutually parallel in the embodiment shown (FIG. 3).

FIG. 3 shows the thrust member 34 in a position rotated by 90° in comparison with FIG. 1, such that, in FIG. 3, a plane 43 that extends in parallel with the main plane of the backing plate 5 and the brake shoe webs 4 is not shown to be vertical, but horizontal, contrary to the actual arrangement. As can be seen, the receiving opening 40 in the adjusting bolt 30 has a relatively large amount of play relative to the thrust member extension 39 on either side in the direction of the plane 43 and thus in parallel with the main plane of the backing plate 5. The thrust member 34 can therefore perform a relatively large pivoting movement in the main plane of the brake shoe webs 4. This pivoting movement is necessary when the brake shoes 2 are spread apart, since the angle of the contact surfaces 44 of the brake shoe webs 4 relative to the central longitudinal axis 33 of the adjusting bolt 30 is then changed and the thrust members 34 also have to be involved in this change in angle in order to maintain the planar contact between their end faces 37 and the contact surfaces 44 of the brake shoe webs 4.

In addition, the thrust member extension 39 also has a certain amount of lateral play relative to the wall of the receiving opening 40 in a transverse plane 45 that is at a right angle to the plane 43 and thus to the main plane of the brake shoe webs 4. This play is, however, significantly smaller than the play in the plane 43 and is only large enough that the thrust member 34 can pivot in the plane 45 to the extent that movement of the brake shoe webs 4, which, due to the manufacturing process, may not be precisely positioned in the main plane thereof, but obliquely relative thereto, does not lead to lateral warping in the adjusting bolt 30 either. The flats 41 of the thrust member extension 39 thus have a certain, if relatively low, amount of play relative to the flats of the adjusting bolt 30. Owing to this play, it is only possible for the adjusting bolt 30 to rotate about its central longitudinal axis 33 to a negligible extent when the thrust member 34 is non-rotationally coupled to the brake shoe web 4.

As can be seen from FIG. 4, the receiving opening 40 is located in an end wall 46 of the adjusting bolt 30. An axial hole 47 which is open towards the central plane 27 of the housing 13 and has a larger diameter than the receiving opening 40 adjoins this end wall 46. The free end of the thrust member extension 39 protrudes slightly into the axial hole 47. Owing to this design, after it has been inserted into the receiving opening 40, it is possible to provide the thrust member extension 39 with a rear-engagement element in the form of one or more moulded portions 48 or projections which engage behind the end face 46 on the side facing away from the ball joint surface 35. This rear-engagement element prevents the thrust member 34 from being able to loosen from the adjusting bolt 30 in the axial direction, and thus prevents the thrust member 34 from being lost or unintentionally loosened from the adjusting bolt 30.

So that the thrust members 34 cannot rotate about their longitudinal axes, they each have a guide device on the side opposite the thrust member extension 39 that cooperates with the brake shoe webs 4 and allows the thrust members 34 to slide along the contact surfaces 44, but non-rotationally couples the thrust members 34 to the brake shoe webs 4.

With reference to FIG. 3 to 5, a thrust member comprising a first embodiment of a guide device of this type is described which can be used in a brake shoe 2 that comprises two mutually spaced brake shoe webs 4. Here, the guide device is formed by a guide web 50, which protrudes axially over the end face 37 so as to be symmetrical with the plane 43. The guide web 50 comprises opposing side walls having lateral guide surfaces 49. As can be seen from FIG. 5, the lateral guide surfaces 49 are located in the upper and lower end regions, respectively, of a guide-web side wall and are separated from one another by a centrally set-back depression 51 such that the guide web 50 has a tapered shape. The width of the guide web 50 in the region of the lateral guide surfaces 49 is such that the guide web 50 can be inserted with little lateral play between the two brake shoe webs 4 of the brake shoe 2 and is guided thereby in a non-rotational manner. The depressions 51 shorten the contact surface between the guide web 50 and the brake shoe webs 4 and produce a clearance therebetween. As a result, the thrust members 34 slide on the brake shoe webs 4 more easily. In addition, the risk of dirt building up in the region of the lateral guide surfaces 49 is reduced.

FIG. 6 shows another embodiment of a guide device which is used in thrust members that interact with a single brake shoe web 4. In this case, the lateral guide surfaces 49' are formed by the side walls of a guide groove 52 that is positioned in the main plane of the brake shoe web 4 and is made on the side of the thrust member 34 facing the brake shoe web 4. The distance between two opposing guide surfaces 49' is only slightly greater than the thickness of the brake shoe web 4, such that the brake shoe web 4 is in turn positioned in the guide groove 52 with only a small amount of lateral play. Here too, a non-rotational but movable coupling is produced between the thrust member 34 and the brake shoe web 4. In addition, the side walls of the guide groove 52 comprise centrally set-back depressions 51 which have the same function as those that have been described on the basis of the embodiment in FIG. 3 to 5.

As can also be seen from FIG. 2 to 6, a sealing contact surface 53 in the form of a cylindrical circumferential surface adjoins the ball joint surface 35 of each thrust member 34. The sealing contact surface 53 is therefore in the direct proximity of the ball joint. In addition, the sealing contact surface 53 is positioned radially on the inside and in the same or at least a similar axial position as a sealing contact surface 54 (FIG. 2) that is provided on the outer end of the cylinder portions 16 of the housing 13. The space between the two sealing contact surfaces 53, 54 is covered by a resilient and temperature-resistant seal in the form of a bellows 55. The main plane of the bellows 55 is at least substantially perpendicular to the central longitudinal axis 33 of the adjusting bolt 30. In this way, only a minimal part of the bellows 55 is exposed to the heat radiation generated by the friction on the brake drum 11.

As can also be seen from FIG. 2, the sealing points between the bellows 55 and the housing 13 are designed such that primary sealing from the surroundings is provided on axial sealing surfaces 56 and secondary sealing is provided on radial sealing surfaces 57, which are at right angles to the axial sealing surfaces 56. In the same way, the sealing points between the bellows 55 and the thrust member 34 are designed such that primary sealing from the surroundings is provided on axial sealing surfaces 58 and secondary sealing is provided on radial sealing surfaces 58. This provides very reliable, redundant sealing.

The bellows 55 can be reinforced by means of insert rings (not shown) such that, once pressed on or in, a seal is produced that is required for a fordable, i.e. substantially liquid-tight, actuating unit 10.

The thrust members 34 interact with the brake shoes 2 such that, as the wear to the friction lining 3 increases, the contact region between the thrust member 34 and the brake shoe web 4 along the contact surfaces 44 shifts, since the upper end 9 of the brake shoe web 4 pivots outwards and downwards. As a result, the thrust member 34 is forced to slide along the contact surface 44. On the opposite side, the ball head of the thrust member 34 pivots in the ball socket of the adjusting bolt 30 at the same time. If the pivot range of the ball head bearing brought about by geometry is not exceeded, the application of force remains in the centre of the adjusting bolt 30. In FIG. 2, the central axis of the thrust member 34 aligns precisely with the central longitudinal axis 33 of the adjusting bolt 30. Ideally, this particular state arises during braking if both friction linings 3 are worn evenly and halfway. Therefore, when the friction linings 3 are new a positive angle is produced, whereas a negative angle of equal size is produced when said linings are worn. Since the size of this angle is small, however, the thrust member 34 is not shifted in an undesired manner when under load due to the frictional forces between the thrust member 34 and the brake shoe web 4. A symmetrical pivot range can be fully utilised.

The invention claimed is:

1. An internal expanding shoe brake comprising an actuating device for expanding brake shoes, the actuating device comprising:
   a housing that is rigidly connected to a backing plate,
   two expansion pistons that are movably mounted in the housing, and
   an expansion device for pushing the expansion pistons apart, wherein
   at least one of the expansion pistons is coupled to an adjusting bolt that comprises a screw shank, which is arranged within the expansion piston and is adjustable in its axial direction, and an outer joint portion, which is in pressure contact with a thrust member that is in pressure contact both with the joint portion of the adjusting bolt by means of a ball joint and with a brake shoe web,
   the ball joint comprises a ball joint surface that is formed on the adjusting bolt and a ball joint surface that is formed on the thrust member and is complementary thereto,
   an anti-twist protection device is provided for preventing rotational movement of the adjusting bolt, and
   the anti-twist protection device for preventing rotational movement of the adjusting bolt comprises a thrust member extension that protrudes beyond the ball joint surface of the thrust member and engages in a form-fitting manner in a receiving opening in the adjusting bolt with lateral play under formation of a rotary coupling connection,
   wherein the thrust member extension comprises a flat surface, and wherein the receiving opening has a flat surface that is complementary to and mutually parallel with the flat surface of the thrust member extension, wherein engagement between the flat surface of the thrust member extension and the flat surface of the receiving opening substantially prevents relative rotation between the adjusting bolt and the thrust member around the central longitudinal axis of the adjusting bolt.

2. The internal expanding shoe brake according to claim 1, wherein the thrust member extension is arranged centrally on the thrust member and the receiving opening in the adjusting bolt is designed as a central axial opening.

3. The internal expanding shoe brake according to claim 1, wherein the lateral play of the thrust member extension within the receiving opening in parallel with the main plane of the backing plate is greater than in a transverse plane that is at right angles to the main plane.

4. The internal expanding shoe brake according to claim 1, wherein the thrust member extension comprises a rear-engagement element for axially securing the thrust member to the adjusting bolt.

5. The internal expanding shoe brake according to claim 4, wherein the rear-engagement element consists of a moulded portion on the free end of the thrust member extension, which portion engages behind a diametric shoulder of the receiving opening.

6. The internal expanding shoe brake according to claim 1, wherein the rotary coupling connection between the thrust member and the adjusting bolt is formed by means of parallel flat surfaces, which are provided both on the thrust member extension and on the wall defining the receiving opening in the adjusting bolt.

7. The internal expanding shoe brake according to claim 1 wherein the thrust member comprises lateral guide surfaces for laterally guiding the thrust member on the brake shoe web on the side opposite the thrust member extension.

8. The internal expanding shoe brake according to claim 7, wherein the lateral guide surfaces are formed by side walls of a guide groove located in the main plane of the brake shoe web.

9. The internal expanding shoe brake according to claim 8, wherein the side walls comprise centrally set-back depressions to produce a clearance between the brake shoe web and the side walls.

10. The internal expanding shoe brake according to claim 7, wherein the lateral guide surfaces are formed by side walls of a guide web.

11. The internal expanding shoe brake according to claim 1, wherein a sealing contact surface adjoins the ball joint surface of the thrust member and, when viewed in the axial direction of the expansion piston, overlaps with and is radially within a sealing contact surface of the housing.

12. The internal expanding shoe brake according to claim 11, wherein the ball joint surfaces are sealed from the outside by means of a bellows, which is at least substantially in a plane perpendicular to the central longitudinal axis of the expansion piston and comprises both axial sealing surfaces for primary axial sealing and radial sealing surfaces adjacent thereto for secondary radial sealing.

* * * * *